M. MILCH.
ALTERNATING CURRENT DYNAMO ELECTRIC MACHINE.
APPLICATION FILED APR. 8, 1904.

977,821.

Patented Dec. 6, 1910.

3 SHEETS—SHEET 1.

Witnesses:

Inventor,
Maurice Milch.
by Albert G. Davis
Att'y.

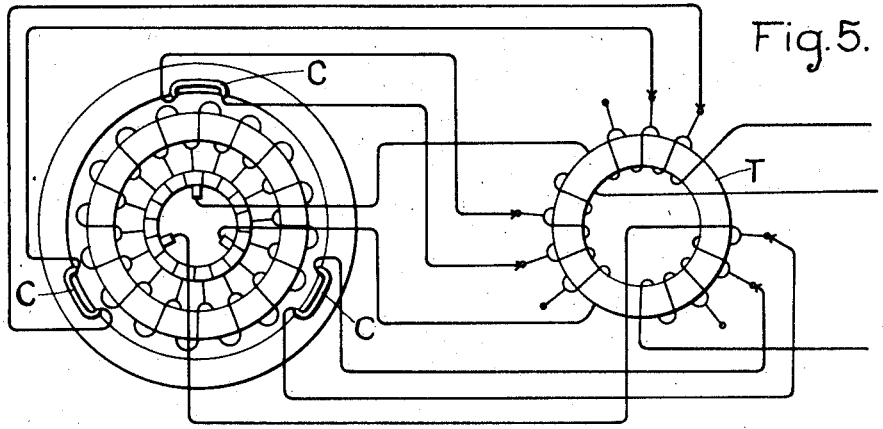
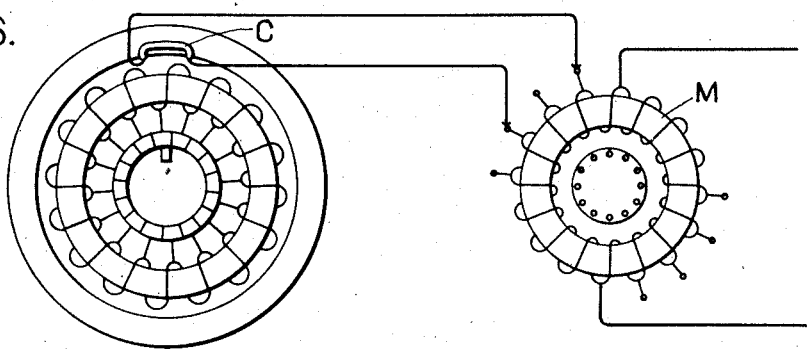
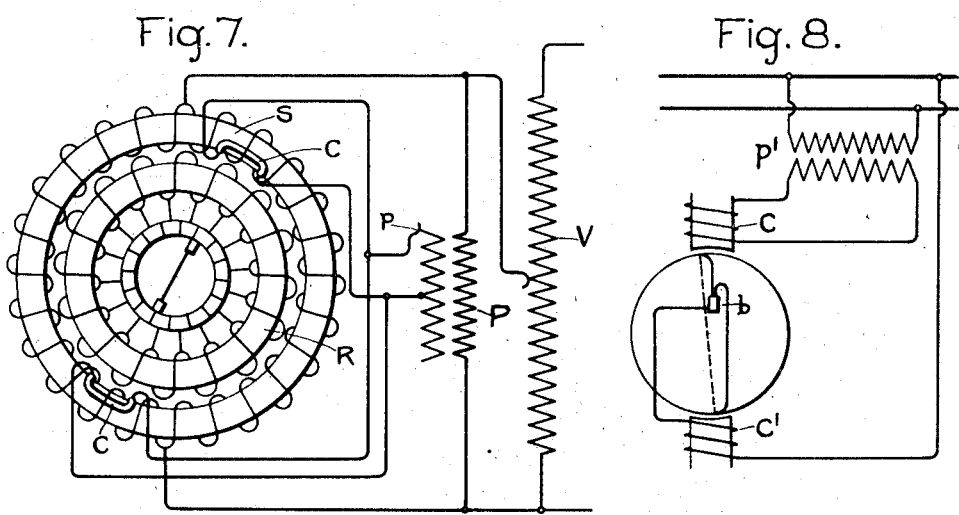

M. MILCH.
ALTERNATING CURRENT DYNAMO ELECTRIC MACHINE.
APPLICATION FILED APR. 8, 1904.

977,821.

Patented Dec. 6, 1910.

3 SHEETS—SHEET 3.

Witnesses:

Inventor,
Maurice Milch.
by
Att'y.

UNITED STATES PATENT OFFICE.

MAURICE MILCH, OF SCHENECTADY, NEW YORK, ASSIGNOR TO GENERAL ELECTRIC COMPANY, A CORPORATION OF NEW YORK.

ALTERNATING-CURRENT DYNAMO-ELECTRIC MACHINE.

977,821.    Specification of Letters Patent.    Patented Dec. 6, 1910.

Application filed April 8, 1904. Serial No. 202,134.

*To all whom it may concern:*

Be it known that I, MAURICE MILCH, a subject of the King of Hungary, residing at Schenectady, county of Schenectady, State of New York, have invented certain new and useful Improvements in Alternating-Current Dynamo - Electric Machines, of which the following is a specification.

My invention relates to alternating current dynamo electric machines of the commutator type having a fluctuating field, and its object is to improve the commutation of such machines. There are many types of alternating current motors known in the art, such as series motors, repulsion motors, and many modified forms, which depend for the principle of their operation on a commutator. It is much more difficult to secure sparkless commutation in an alternating current motor than in a direct current machine, since in a direct current machine the coil, at the instant it is undergoing commutation, is in a constant field, while in an alternating current machine the coil which is short-circuited by the brush incloses a rapidly fluctuating field, which induces an electro-motive force and produces large current flow in the short circuited coil. This results in heating and excessive sparking as the coil leaves the brush. It has been proposed heretofore to improve the commutation of alternating current machines by reducing the current in the short circuited coils by means of resistances inserted in the commutator leads. The use of resistances, while it improves commutation, wastes power. It does not remove the cause of bad commutation, but merely reduces its effects.

By my invention I fully remove the cause of bad commutation in alternating current machines by producing in each coil as it is short-circuited by the brush an electro-motive force nearly equal and opposite in phase to that induced by the fluctuating field. In this manner I do not simply reduce the amount of the short-circuit currents, but neutralize the electro-motive force which produces them.

My invention will best be understood from the accompanying drawings, in which—

Figure 1:
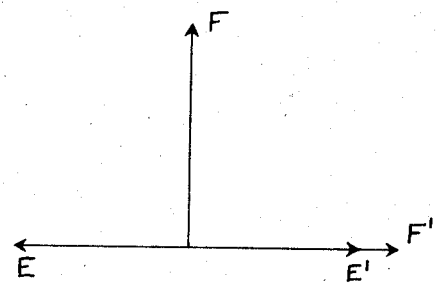
Figure 2:
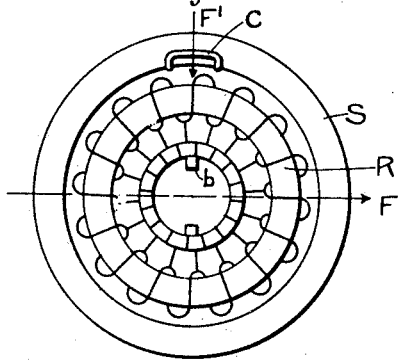
Figure 3:
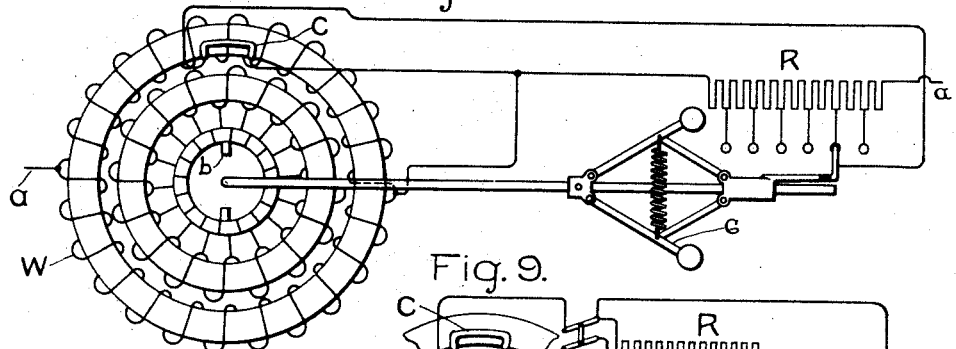
Figure 9:
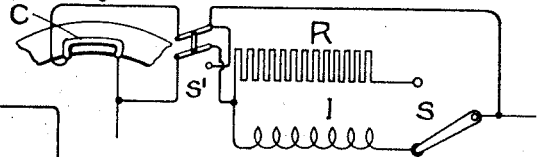
Figure 4:
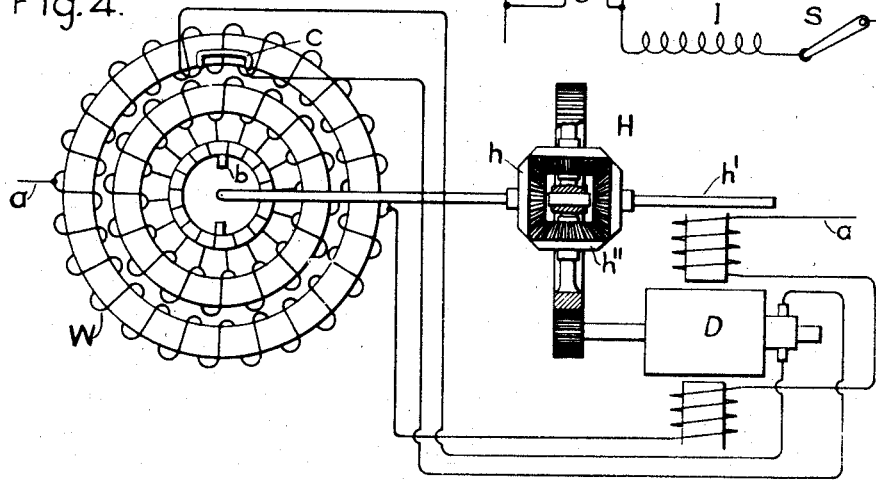
Figure 11:
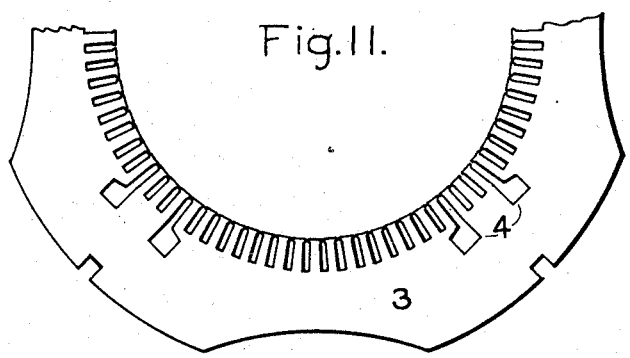
Figure 10:
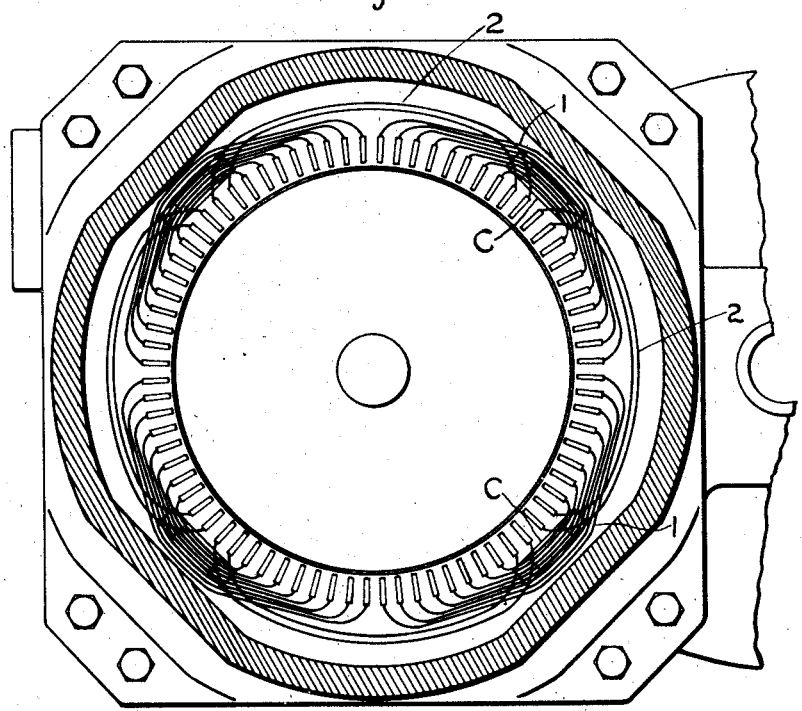

Figure 1 is an explanatory diagram; Fig. 2 shows diagrammatically my invention applied to an alternating current commutator motor; Fig. 3 shows an arrangement for automatically varying the current flow in the commutating coil to meet the requirements of varying speed; Fig. 4 shows another arrangement for the same purpose; Fig. 5 shows an arrangement applicable for polyphase motors; Fig. 6 shows a similar arrangement for single-phase motors; Fig. 7 shows another arrangement for controlling the current in the commutating coil and as applied to a repulsion motor; Fig. 8 shows an arrangement for compensating for the commutation reactance in addition to the fluctuating field effect produced by the motor currents; Fig. 9 shows an arrangement for utilizing the commutator coil to increase the starting torque of the motor; Fig. 10 shows a series motor arranged in accordance with my invention; and Fig. 11 is a detail of the stator punchings.

Referring first to Fig. 1, if F represents in magnitude and phase the fluctuating field threading a short-circuiting coil, E will represent the phase of the electro-motive force induced in the coil by the field, lagging 90 degrees behind the field. Now if a second electro-motive force E' could be induced in the coil equal and opposite to E, the effect of the fluctuating field would be neutralized, and no short-circuited current would flow. In order to induce this second electro-motive force E', I take advantage of the motion of the short-circuited coil by producing a field F' 90 degrees ahead of the field F, and arranged to be cut by the rotating short-circuited coil. An electro-motive force E' will be induced in phase with the field F', and consequently opposite to the electro-motive force E. If the field F' is of the proper magnitude, the electro-motive force E will be completely neutralized.

In Fig. 2, S represents the stator and R the rotor of an alternating current motor of the commutator type. Neither the winding of the stator nor the connections of the stator or rotor are shown, since they are wholly immaterial for the purposes of my invention. Let it be merely assumed that a fluctuating field exists, as shown by the arrow F, and let a brush *b* bear on the commutator, so as to short-circuit a coil through which passes the fluctuating field in the rotor. Now, if a coil C be placed as shown, opposite the short-circuited coil, and if it is energized by a current, it will produce a field F', as indicated by the arrow. If this field F' is of the proper magnitude and phase, an electro-motive force may be produced in the short-circuited coil equal and opposite to that induced by the fluctuating field F'. Thus the flow of current in the short-circuited coil will be prevented, and sparkless commutation obtained.

Fig. 3 shows one arrangement for obtaining the proper magnitude and phase for the current in the commutating coil C. In this figure I have shown a winding W adapted to produce a field as indicated by arrow F in Fig. 2, and connected in a circuit $a\ a$. The motor connections are not shown in the diagram, since they are for present considerations of no importance. The motor may be series, repulsion, or any other type of commutator motor. The winding W may be on stator or rotor. The current in it may be impressed or induced. It is simply assumed that the current in winding W produces a fluctuating field threading the coil short-circuited by brush $b$. A resistance R is connected in series with winding W, so as to be traversed by the current which produces the fluctuating field, and the commutating coil C is connected to variable portions of the resistance R. A speed governor G on the shaft of the motor shifts one of the points of connection of coil C along the resistance R, as the motor speed varies. With this arrangement a proper phase and magnitude of current in the commutating coil may be obtained, as will appear from the following considerations. The current flowing through the resistance R has been assumed to be the current which produces the fluctuating field in the motor. The potential across the terminals of resistance R is consequently always in phase with the fluctuating field: that is, in phase with the line F in Fig. 1. The impressing of this voltage upon the commutating coil causes a field displaced by nearly 90 degrees from the voltage, which may be represented by the line F" in Fig. 1: that is, the field produced by the commutating coil is of the proper phase. As regards magnitude, the potential across the terminals of R is directly proportional to the current flowing in winding W, and as the fluctuating field is produced by the current flowing in winding W, the potential flowing across resistance R is approximately proportional to the fluctuating field. Consequently the field produced by the commutating coil C varies proportionally to the fluctuating field, and may be of the proper value for all values of current flow in the motor. The electro-motive force induced in the short-circuited coil, due to cutting the field of coil C, is, however, proportional not only to the field strength of coil C, but also to the speed of rotation of the short-circuited coil. The function of the governor G is to vary the current through coil C, and consequently its field strength as the speed of the motor varies. As the motor speeds up, the potential across the terminals of coil C is automatically reduced by the governor G, and in this manner the proper counter-potential in the short-circuited coil is always maintained.

Fig. 4 shows another arrangement for automatically maintaining the proper current flow through the commutating coil C. In this arrangement a separate exciter D is employed for the commutating coil and the field of the exciter is connected in series with the winding W, thereby insuring the proper phase relation at all times for the electro-motive force impressed upon the coil C, since the electro-motive force induced in the armature of exciter D must at all times be in phase with the current in winding W. Moreover, the value of the electro-motive force impressed upon coil C will vary with the current through winding W in the same manner as in Fig. 3, since the electro-motive force induced in the armature of exciter D is proportional to the current in its field coils. In order to obtain the proper variation of the impressed electro-motive force in coil C with the variation in speed of the motor, the differential gear H may be employed, one member $h$ being driven by the motor, while a second member $h'$ may be driven at constant speed from any convenient source of power. The third member $h''$ drives the armature of exciter D. Thus, when the motor is stationary, the armature of exciter D will revolve at full speed. As the motor speeds up, and the velocity of the short-circuited coil relative to the field of coil C increases, the armature of exciter D will slow down, thereby maintaining the proper electro-motive force on coil C.

In the case of a polyphase motor a convenient method of obtaining the proper phase and magnitude of the impressed voltage for commutating coils is that shown in Fig. 5. Here a polyphase series transformer is utilized for this purpose, the variation in the electro-motive force impressed upon the coils C being secured by shifting the points of connection of these coils to the polyphase transformer T. This shifting may be obtained automatically by the speed governor shown in Fig. 3, or by any other equivalent arrangement.

Fig. 6 shows a similar arrangement applicable to single-phase motors. When no polyphase source is available, the equivalent of a polyphase transformer may be obtained by using a single-phase induction motor which has the characteristic of producing a rotating field in its windings. By shifting the points of connection of the coil C along the taps on the primary winding of the single-phase motor M, a proper adjustment of the phase and magnitude of the electro-motive force impressed upon the coil C may be obtained.

In Fig. 7 I have shown another arrangement for obtaining suitable phase and magnitude relations of the electro-motive force impressed upon the commutating coil, and have shown it applied to a repulsion motor. The stator winding S is connected to a voltage regulator V as shown, while the electro-motive force for the commutating coils C is obtained from the variable secondary of a potential transformer connected across the motor terminals. The rotor R is shown short-circuited on itself in the usual manner. Since the potential of the secondary of transformer P is practically 180 degrees out of phase with the voltage impressed upon the primary member, and since the fluctuating field in a repulsion motor at normal speeds is approximately in phase with the impressed voltage, the electro-motive force impressed upon the coils C is approximately in phase, or 180 degrees out of phase, with the fluctuating field, and the current in the coils C is consequently approximately 90 degrees out of phase with this fluctuating field: that is, it is of the phase desired. The ratio of transformation of the potential transformer P may be varied by the speed governor of Fig. 3, or a similar device acting on the movable contact $p$. Consequently the impressed voltage on the coils C may be kept of the proper value for all speeds at any given value of impressed voltage on the motor. Furthermore, since the primary of potential transformer P is connected across the motor terminals, the electro-motive force impressed on coil C will be of the proper amount for all values of the voltage impressed upon the motor, since the voltage impressed upon the coils C is proportional to the voltage impressed upon the motor, which in turn is proportional to the fluctuating field. Consequently the magnitude of the voltage impressed upon the coil C will be correct for all loads and for all values of impressed voltage on the motor. This arrangement for controlling the compensating coils is applicable not only to a repulsion motor as shown, but also to any form of alternating current motor of the commutator type. In the arrangement of Fig. 7, the secondary of the potential transformer P is made not only variable, but also reversible. The reason for this is that in the repulsion motor a field exists at all times, which acts as a commutating field. The fluctuating field, which produces sparking in the short-circuited coils, is a field produced by the working currents of the motor, and is consequently, at normal speeds, nearly in phase with the impressed voltage. There is a second field, however, which produces the counter-electromotive force of the motor. This field is in phase with the magnetizing component of the primary current, and may be called the magnetizing field. It is 90 degrees out of phase with the impressed voltage. In other words, this second field is of approximately the proper phase to assist in producing proper commutation. Below synchronism the electro-motive force produced in the short-circuited coils by the fluctuating field of the working currents is greater than that due to cutting the magnetizing field. As the speed of the motor increases, however, and as the amount of current flow in the motor decreases, the electro-motive force induced in the short-circuited coil by cutting the magnetizing field increases, while the other electro-motive forces decrease, until above synchronism the cutting electro-motive force overpowers the electro-motive force due to the fluctuating field, and itself becomes the cause of heavy short-circuit currents and sparking. In order to enable the motor to operate with proper commutation below and above synchronism, the secondary of the potential transformer P is made not only variable but reversible, as has already been stated. If the movable contact is actuated by a speed governor, the electro-motive force impressed upon the coils C may be made to assist the field due to the magnetizing currents of the motor below synchronism, and to oppose that field above synchronism. With this arrangement sparkless operation of the motor may be obtained through its entire range. The same is true of the arrangement of Fig. 4, since if shaft $h'$ is driven at synchronous speed the direction of rotation of exciter D will be reversed when the motor runs above synchronism.

When the transformer arrangement of Fig. 7 is used for controlling commutating coils of an alternating current motor, the electro-motive force impressed upon the commutating coils is of the proper phase relation only so long as the motor currents are nearly in phase with the impressed electro-motive force. At starting, the power factor of alternating current motors is low, and the motor current is more nearly 90 degrees out of phase with the impressed voltage than in phase with it. The electro-motive force impressed upon the coils C is, as has already been stated, 180 degrees out of phase with the impressed voltage. Consequently at starting the voltage impressed on coil C is little more than 90 degrees out of phase with the motor currents. The current in coils C, which is 90 degrees behind the impressed voltage, will consequently be practically in phase with or in opposition to the motor currents. The field of these compensating coils is consequently not of the proper phase relation to assist in commutation. At low speeds, however, the question of commutation may be a less serious one if the current in the commutator coils be utilized to increase the starting torque of the motor; since, being nearly 180 degrees out of phase with the motor currents, it is of the proper phase relation for producing torque. This torque may be positive or negative, according to the connection of the commutating coils; and to produce a positive torque, the commutating coils should be connected to the secondary of transformer P oppositely to the way they are connected for operation below synchronism. In other words, the movable contact $p$ should be moved to one side of its central position at starting, in order to produce a torque which will assist the motor in starting; and then when the motor begins to revolve, it should be returned to the other side of its central position. This variation in the connection of the coils C may be obtained independently of the transformer by the reversing switch, if preferred.

When the potential for the commutator coils is obtained from the terminals of a resistance connected in series with the working currents of the motor, the potential impressed upon these coils will always be of the proper phase relation for producing a commutating field. If, however, it is desired to utilize the commutating coils for increasing the starting torque of the motor, the arrangement of Fig. 9 may be employed. In this arrangement, the switch $s$ is provided for shifting the terminal connections of the coil C from the resistance R to the impedance I, and the switch $s'$ is provided for reversing the connections of coil C. With this arrangement and with coil C connected across impedance I, the potential impressed on coil C will be 90 degrees out of phase with the motor currents, and the current in coil C 180 degrees out of phase with these currents: that is, of the proper phase for producing a starting torque. As the motor starts, switches $s$ and $s'$ are thrown to their opposite positions, in order to produce the commutating field.

So far, the fluctuating field in the short-circuited coils has been considered as due to the motor currents alone, which are by far the most important source of electro-motive force. But in all commutating machines, whether designed for direct or alternating current, there is another source of sparking at the brushes, which is termed "commutation reactance." This consists in the induction due to the rapid variation in the current flowing through the coil as it is commutated. The electro-motive force induced by the commutation reactance is in phase with the current. Although this cause of sparking is of much less importance in alternating current motors than the fluctuating field through the short-circuited coil, due to the motor currents, and may ordinarily be left out of consideration, it is possible, by means of my invention to completely neutralize this also. Thus, in Fig. 8 I have shown two coils, one of which, C, is connected to the potential transformer P', while the other, C', is in series with a coil short-circuited by the brush $b$. The field of coil C will be practically 90 degrees out of phase with the motor currents and will act to neutralize the fluctuating field due to the motor currents, as has been heretofore explained; while the coil C' will produce a field in phase with the motor currents, which will consequently neutralize commutation reactance. It is not necessary that separate poles should be used in order to produce the two field components to neutralize both effects. A single coil, having impressed upon it an electro-motive force of the proper phase relation, will serve to neutralize the effect of all sources of electro-motive force in the short-circuited coils. The arrangements of Figs. 5 or 6, or their equivalent, may be utilized for obtaining the proper electro-motive force to be impressed upon a single coil for neutralizing the fluctuating fields due to both the motor currents and the variation of current in the coil that is being commutated.

In Fig. 10 I have shown a series motor structure adapted to my invention. The primary windings are indicated by the reference number 1, and are of the well known basket type of distributed winding. The machine shown is a four-pole machine. In addition to the windings 1 I have shown auxiliary windings 2 displaced 90 degrees from the windings 1. The purpose of winding 2 is to shift the line of magnetization of the motor in order to reverse the direction of rotation, as described in my application for United States patent, Serial No. 179,031, filed October 29, 1903. C C represent the commutating coils of my invention for the accommodation of which certain of the slots for the primary winding are extended as shown in Fig. 11. In this figure, 3 represents a portion of a punching for the stator of the motor, and shows some of the slots extended as at 4 to receive the commutating coils. This construction makes a compact arrangement of the several coils, and is particularly adapted for alternating current motors which require a distributed winding for most satisfactory operation, as for instance a series or repulsion motor.

Although I have shown various ways for automatically varying the electro-motive force impressed upon the commutating coils, it is evident that the control may be manual, if preferred, and furthermore, that the control may be omitted entirely in the case of a motor designed to operate at practically constant speeds and loads, since in this case the commutating field, if once properly adjusted, will be at all times approximately correct. Furthermore, even in the case of a motor designed for operation at various speeds and loads, control of the current in the commutator coils may be omitted if it is desired to simplify the arrangement. In this case, the electro-motive force may be adjusted for the average speed and load of the motor, and the commutation for all speeds and loads will be materially improved. Accordingly, I do not desire to limit myself to the particular construction and arrangement of parts here shown, since changes which do not depart from the spirit of my invention, and which are within the scope of the appended claims, will be obvious to those skilled in the art.

What I claim as new, and desire to secure by Letters Patent of the United States, is,—

1. In an alternating current dynamo-electric machine having a fluctuating field, a rotor winding provided with a commutator, brushes bearing on said commutator, and means for inducing in the coils short-circuited by the brushes an electro-motive force equal and opposite to the electro-motive force due to the fluctuating field threading said short-circuited coils.

2. In an alternating current dynamo-electric machine having a fluctuating field, a rotor winding provided with a commutator, brushes bearing on said commutator, and means for producing a local field adapted to be cut by the coils short-circuited by the brushes and of a magnitude and phase adapted to produce in said coils an electro-motive force equal and opposite to the electro-motive force induced by the fluctuating field threading said coils.

3. In an alternating current dynamo-electric machine having a fluctuating field, a rotor winding provided with a commutator, brushes bearing on said commutator, and means for neutralizing at varying speeds and loads the electro-motive force in the coils short-circuited by the brushes induced by the fluctuating field threading said coils.

4. In an alternating current dynamo-electric machine having a fluctuating field, a rotor winding provided with a commutator, brushes bearing on said commutator, a commutating coil disposed adjacent to the rotor coils short-circuited by the brushes and adapted to produce a local field to be cut by said coils, and means for supplying to said commutating coil a current of a magnitude and phase adapted to produce a field which when cut by said coils neutralizes the electromotive force induced by the fluctuating field threading said coils.

5. In an alternating current motor, a rotor winding provided with a commutator, brushes bearing on said commutator, a commutating coil adapted to produce a field to be cut by the rotor coils short-circuited by the brushes, means for impressing an electromotive force on said coil, and means for varying said electro-motive force as the load and speed of the motor vary.

6. In an alternating current motor, a rotor winding provided with a commutator, brushes bearing on said commutator, a commutating coil adapted to produce a field to be cut by the rotor coils short-circuited by the brushes, and means for impressing on said coil an electro-motive force in phase with and varying with the currents supplied to the motor.

7. In an alternating current motor, a rotor winding provided with a commutator, brushes bearing on said commutator, a commutating coil adapted to produce a field to be cut by the rotor coils short-circuited by the brushes, means for impressing on said coil an electro-motive force in phase with and varying with the currents supplied to the motor, and means for varying the said electro-motive force as the motor speed varies.

8. In an alternating current motor, a rotor winding provided with a commutator, brushes bearing on said commutator, a commutating coil adapted to produce a field to be cut by the rotor coils short-circuited by the brushes, means for varying the voltage impressed upon the motor, and means for impressing on said commutating coil a voltage in phase with the fluctuating field threading the short-circuited coils and varying with the impressed motor voltage.

9. In an alternating current motor, a rotor winding provided with a commutator, brushes bearing on said commutator, a commutating coil adapted to produce a field to be cut by the rotor coils short-circuited by the brushes, means for varying the voltage impressed upon the motor, means for impressing on said commutating coil a voltage varying with the impressed motor voltage, and means for varying the voltage impressed on said coil as the motor speed varies.

10. In an alternating current motor, a rotor winding provided with a commutator, brushes bearing on said commutator, a commutating coil adapted to produce a field to be cut by the rotor coils short-circuited by the brushes and thereby to neutralize the electro-motive force induced in said short-circuited coils by the fluctuating field threading said coils, and means for reversing the relative direction of current flow through said coil at starting.

11. In an alternating current motor, a rotor winding provided with a commutator, brushes bearing on said commutator, a commutating coil adapted to produce a field to be cut by the rotor coils short-circuited by the brushes, means for impressing on said coil an electro-motive force in phase with the motor currents, and means for shifting the phase of said electro-motive force at starting.

12. In an alternating current motor, a rotor winding provided with a commutator, brushes bearing on said commutator, a commutating coil adapted to produce a field to be cut by the rotor coils short-circuited by the brushes, means for impressing on said coil an electro-motive force in phase with and varying with the motor currents, and means for shifting the phase of said electromotive force and reversing the connections of said commutating coil at starting.

13. In an alternating current motor, a rotor winding provided with a commutator, brushes bearing on said commutator, a commutating coil adapted to produce a field to be cut by the rotor coils short-circuited by the brushes and thereby to neutralize the electro-motive force induced in said short-circuited coils by the fluctuating field threading them, and means for connecting said commutating coil to increase the starting torque of the motor.

14. In an alternating current motor, a rotor winding provided with a commutator, brushes bearing on said commutator, means for producing a commutating field adapted to be cut by the rotor coils short-circuited by the brushes and to produce in said coils an electro-motive force opposing the electromotive force induced by the fluctuating field threading said coils, and means for varying the phase of the commutating field at starting to increase the torque of the motor.

15. In an alternating current motor, a rotor winding provided with a commutator, brushes bearing on said commutator, and means for producing a field adapted to be cut by the coils short-circuited by the brushes, said field being adapted in phase and magnitude to produce in said coils an electro-motive force equal and opposite to the electro-motive forces induced in said coils while short-circuited.

16. In an alternating current motor, a rotor winding provided with a commutator, brushes bearing on said commutator, and means for producing a field adapted to be cut by the coils short-circuited by the brushes, said field having one component 90 degrees out of phase with the motor currents and of a magnitude to neutralize the electro-motive force induced in said coils by the fluctuating field produced by the motor currents and a second component in phase with the motor currents and of a magnitude to neutralize the electro-motive force due to commutation reactance.

17. In an alternating current motor, a rotor winding provided with a commutator, a distributed stator winding arranged in slots on the inner periphery of the stator, a portion of the stator slots being extended outwardly away from the rotor, and commutating coils arranged in the extensions of the stator slots.

18. In an alternating current motor, a stator structure slotted on its inner periphery to receive a distributed winding, a portion of the slots being extended radially away from the rotor to receive commutating coils therein.

19. In an alternating current dynamo-electric machine having a fluctuating field, a rotor winding provided with a commutator, brushes bearing thereon, and a commutating coil disposed adjacent to the rotor coils short-circuited by the brushes, said coil being supplied with current of proper phase and magnitude to produce a field which when cut by the short-circuited coils induces therein an electromotive force of opposite phase to the electromotive force induced by the fluctuating field threading said coil.

20. The method of improving commutation in alternating current dynamo-electric machines of the commutator type having a fluctuating field, which consists in causing each coil as it is short-circuited by a brush to cut a field adapted in phase and magnitude to produce in the coil an electro-motive force equal and opposite to that induced by the fluctuating field threading the coil.

21. The method of improving commutation in alternating current dynamo-electric machines of the commutator type having a fluctuating field, which consists in producing a local field adjacent to the coils short-circuited by a brush adapted in phase and magnitude to produce in said coils an electro-motive force equal and opposite to that induced by the fluctuating field threading said coils.

22. The method of improving commutation in alternating current motors of the commutator type, which consists in producing a local commutating field adapted to be cut by the coils short-circuited by a brush and to produce in said coils an electromotive force opposed to that induced by the fluctuating field threading said coils and varying the magnitude of the first named field as the load and speed of the motor vary.

23. The method of improving commutation in alternating current motors of the commutator type, which consists in neutralizing at varying speeds and loads the electro-motive force induced in the coils short-circuited by a brush by the fluctuating field threading said coils.

24. The method of improving commutation in alternating current motors of the commutator type, which consists in producing a commutating field 90 degrees out of phase with and varying with the currents supplied to the motor.

25. The method of improving commutation in alternating current dynamo-electric machines of the commutator type having a fluctuating field, which consists in producing a commutating field 90 degrees out of phase with the fluctuating field threading said coils.

26. The method of improving commutation in alternating current dynamo-electric machines of the commutator type having a fluctuating field, which consists in producing a field adapted to be cut by the coils short-circuited by a brush and of phase and magnitude adapted to produce in said coils an electro-motive force equal and opposite to that induced in said coils while short-circuited.

27. In an alternating current motor of the commutator conduction type, the combination with the fluctuating main field fluctuating auxiliary commutating fields and means for displacing the phase of the commutating field.

28. In an alternating current motor of the commutator conduction type, the combination with the fluctuating main field, of fluctuating auxiliary commutating fields disposed between the main poles and means for regulating the phase and the strength of the alternate current energizing said auxiliary fields.

29. In an alternating motor of the commutator conduction type, the combination with the main field, of auxiliary commutating fields disposed in the axis of brushes and means for regulating the phase and the strength of said auxiliary fields in relation to the main field.

30. In an alternating current motor of the commutator conduction type, the combination with the main field coils, of auxiliary commutating field coils disposed in the axis of brushes and of means in the circuit of the latter for regulating the phase and the strength of the current energizing said auxiliary field coils, substantially as described.

In witness whereof I have hereunto set my hand this 7th day of April, 1904.

MAURICE MILCH.

Witnesses:
 BENJAMIN B. HULL,
 HELEN ORFORD.